July 17, 1951 D. G. C. HARE 2,560,569

PRECISION MOUNT FOR MAGNETIC RECORDING-REPRODUCING HEADS

Filed July 31, 1948

INVENTOR
DONALD G. C. HARE

BY

[signature]

ATTORNEY

Patented July 17, 1951

2,560,569

UNITED STATES PATENT OFFICE 2,560,569

PRECISION MOUNT FOR MAGNETIC RECORDING-REPRODUCING HEADS

Donald G. C. Hare, Stamford, Conn., assignor to Magnetic Equipment, Inc., Greenwich, Conn., a corporation of Delaware Application July 31, 1948, Serial No. 41,840

4 Claims. (Cl. 179—100.2)

The present invention relates to precision mounting and comprises an improved precision mount for sensitive devices which provides a firm support for one or several sensitive devices, and permits of ready and precise adjustment of the mount as a whole as well as of the relative positions of the individual devices. The new mount, while of general application, is particularly adapted for support of the sensitive transducing devices, or heads, of a magnetic tape recorder and hence will be described with reference to such application.

The various novel features of the invention will be apparent from the following description taken in conjunction with the accompanying drawing of which;

Figures 1, 2:
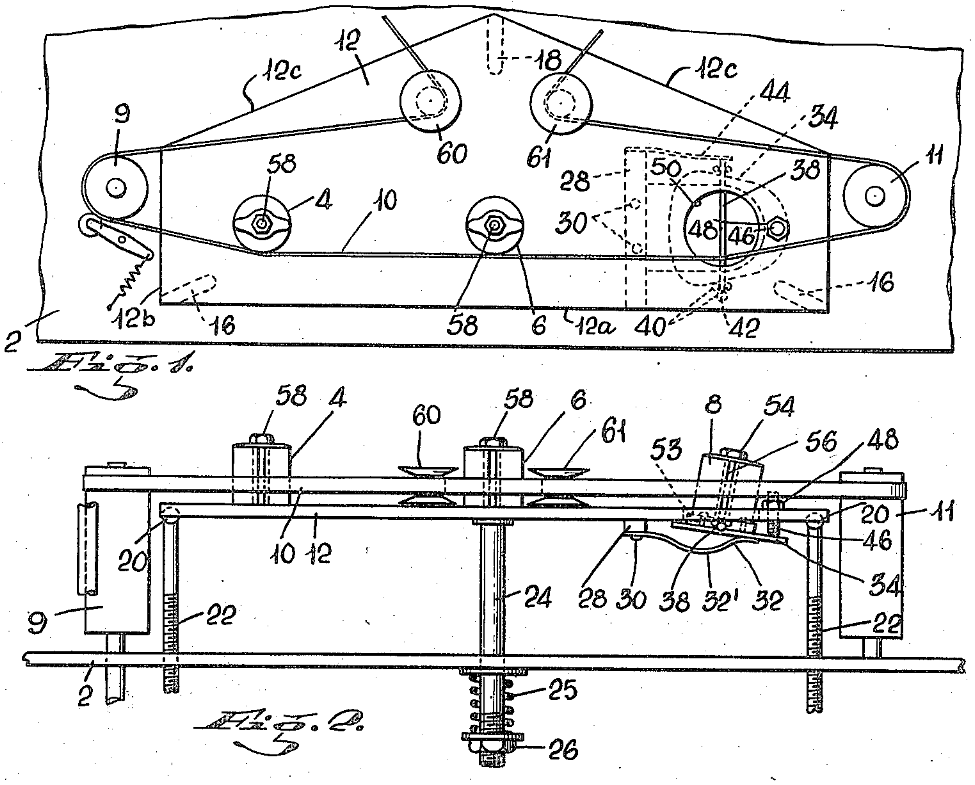
Fig. 1 is a partial top plan view of a magnetic tape recorder provided with the new precision mount for the heads.
Fig. 2 is a front elevation of the mount of Fig. 1.
Figure 3:
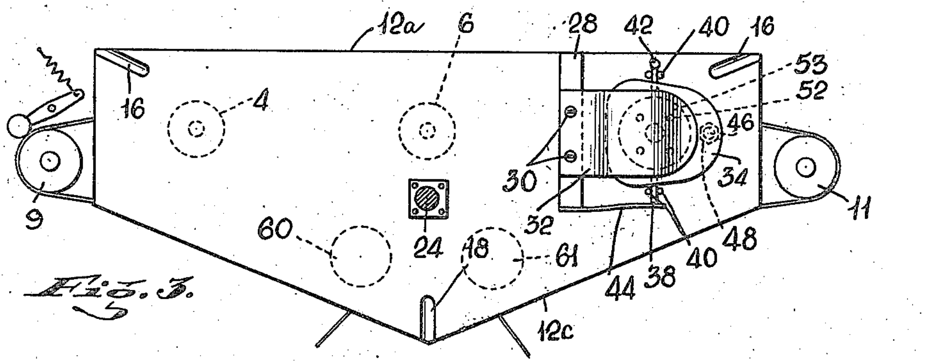
Fig. 3 is a bottom plan view of the mount of Fig. 1.

In the drawing, part of the upper panel or plate of a magnetic tape recorder is indicated at 2. The sensitive heads of the recorder are indicated at 4, 6 and 8, a length of the tape at 10 and a drive capstan and idler at 9 and 11 respectively. The supply and take-up reels for the tape are not shown in the drawing as these elements form no part of the present invention. It will be understood that the reels will be mounted as in usual practice on the panel 2 and that the drive capstan 9, idler 11 and parts now to be described, comprising the precision mount for the heads 4, 6 and 8, will be suitably positioned with respect thereto.

In the particular embodiment of the invention illustrated in the drawing, the new mount includes a panel 12 having a relatively long front edge 12*a*, side edges 12*b* perpendicular to the front edge and two rearwardly extending edges 12*c*. The underside of the panel 12 is provided at each front corner with an elongated groove 16 and at the junction of the edges 12*c* with an elongated groove 18 for reception of ball supports 20. The ball supports 20 are formed integrally with supporting screws 22 which thread through holes in the panel 2. The balls 20 provide a three point suspension for the panel 12, the height of the balls being adjustable from below the base 2 by adjustment of the screws 22. The grooves 16 and 18 preferably extend in directions which intersect at a point substantially at the center of the panel 12. The panel 12 is held in contact with the ball supports 20 by means of a bolt 24 and coiled spring 25. The bolt, which at its lower end has a nut 26 threaded thereon, extends up through a hole in the base 2 and is fixedly secured at its upper end to the underside of the panel 12. The spring 25 is positioned about the lower end of the bolt between the nut 26 and the base plate 2 so as to urge the panel 12 toward the base.

A strip 28 is secured by means of screws 30 to the underside of the panel 12 adjacent the location of the playback head 8, the strip extending rearwardly from the front edge 12*a* of the panel. A relatively strong sheet spring 32 is secured by the screws 30 to the strip 28. The spring engages the underside of a generally tongue shaped member 34, the part of the spring between the strip 28 and the area in contact with member 34 being slightly bowed away from the panel 12, as shown at 32′ in Fig. 2. The member 34 has a generally semi-cylindrical groove cut in the upper face thereof in a direction substantially parallel to the strip 28. A rod 38 is positioned within the groove and is welded or otherwise secured to the member 34 with its ends extending beyond the member 34. Secured in depressions in the undersurface of the panel 12 adjacent each end of the rod 38 is a pair of closely spaced balls 40 which serve as bearings for the rod 38. A pin 42, mounted on the underside of the panel 12 adjacent one end of the rod 38 limits longitudinal movement of the rod in one direction. A leaf spring 44 secured at one end to the strip 28 and engaging the rod 38 at its other end urges the rod into engagement with the pin 42 and thus insures a fixed longitudinal position of the rod 38 and of the member 34 secured thereto. A screw 46 provided with a lock nut 48 is threaded through a hole in the panel 12 and engages the end of member 34 remote from the strip 28. The above described arrangement permits of limited angular adjustment of the element 34 with respect to the panel 12. When the screw 46 is turned in one direction, element 34 is rocked about the axis of the rod 38 against the pressure of spring 32. When the screw 46 is turned in the other direction, element 34 is rocked in the opposite direction by the spring 32. Irrespective of the direction of rotation of the element 34, the rod 38 is maintained in engagement with the balls 40 by the pressure of spring 32, and with the stop 42 by the pressure of spring 44. Other than pivotal movement of element 34 is thus prevented.

The balls 40 and the stop 42 thus provide five points of contact for the member 34 and elements associated therewith, leaving, in accordance with the principles of kinematic design, but one degree of freedom for member 34; namely that of rotation about the axis of rod 38. The adjustable stop 46 provides a sixth point of contact and hence the position of the member 34, for any fixed adjustment of stop 46, is uniquely determined.

The panel 12, above the member 34, is provided with a circular opening 50 therethrough, the axis of which intersects the axis of the rod 38. Within the opening 50 and mounted on the member 34 by means of screws 52 is a disk 53 of substantially the thickness of the panel 12, the diameter of the opening 50 being sufficiently greater than that of the disk 53 to provide clearance between the disk and the walls of the opening at any adjusted angular position of element 34, and the lower surface of the disk being suitably channeled for clearance of the rod 38.

The disk 53 provides support for the playback head 8. For clarity the disk 53 and head 8 are not shown in Fig. 1. The head 8, which may be of conventional construction, is mounted on the disk 53 by a bolt or screw 54 which extends through a suitable passage in the framework of the head and threads into the disk 53. With this arrangement the head 8 may be turned about the bolt 54 as an axis to bring the gap 56 separating the pole faces of the core of the head into position to be bridged by the tape 10. Adjustment of the head to bring the gap 56 parallel to the recording gap of the recording head 6 may be made by means of the screw 46 which serves to rock the head as a whole about the axis of the rod 38. In Fig. 2 member 34 and the head 8 carried thereby are shown at an exaggerated angle to the plate 12 in order to make the construction of the parts clear.

The erase head 4 and recording head 6, in the embodiment of the invention illustrated in the drawing, are mounted for rotational adjustment on the panel 12 by means of screws 58. A pair of pulleys 60 and 61 having central tape engaging portions of reduced diameter are rotatably mounted on the panel 12 for guiding the tape to and from the heads at a level fixed with respect to the panel, the tape travel during recording or play-back being from the supply reel (not shown), around pulley 60, capstan 9, to and by the heads, then around idler 11 and pulley 61 to the take up reel (not shown).

It will be apparent that in the above-described construction the playback head is firmly supported at all times, and yet its position is adjustable about each of two mutually perpendicular axes, one axis being that of the supporting screw and the other that of rod 38. The spring 32, by its pressure on the element 34, prevents vibration of the playback head and insures that the head will be firmly held in adjusted position. The construction permits of ready removal of the playback head for repair or replacement and for precise adjustment of any new or replaced head. The attachment of the panel 12 to the base 2 by the single bolt 24 permits of ready removal and replacement as a unit of the panel 12 and of the parts carried thereby. As the tape guide pulleys 60 and 61 and the heads are all mounted on the panel 12, removal and replacement of the panel does not disturb the level adjustment of the tape with respect to the heads. The level of panel 12 and the height thereof above the panel 2 may be precisely adjusted by adjustment of the screws 22 and the orientation of the erase and recording heads relative to the tape can be adjusted by rotation about the axes of the screws 58.

If desired, an adjustable kinematic mount like that described for the support and precise orientation of the playback head could be provided for the other heads of the recorder, although it is ordinarily sufficient to provide such support for the playback head only.

The invention has now been described with reference to a single embodiment thereof, but obviously various changes could be made in the particular construction illustrated in the drawing without departing from the spirit of the invention or from the scope of the appended claims.

The following is claimed:

1. A precision mount for at least two magnetic sound transducing devices each of the type having a core with pole faces separated by a gap, comprising in combination a panel, support means therefor, means for mounting one of the devices on said panel with its gap oriented in any desired direction, a plate pivotally mounted on the panel, support means for another of the devices secured to said plate, means for securing such other device to the support means therefor with its gap oriented in any desired direction and means carried by said panel for adjusting the angular relation between the plate and the panel whereby the orientation of the gaps of the devices may be controlled by adjustment of the devices on their respective support means and adjustment to bring the gaps parallel may be effected by adjustment of the angular position of the plate relative to the panel.

2. In a magnetic tape recording and reproducing device having recording and reproducing heads, a mount for the heads comprising a panel, means for supporting the panel in a substantially horizontal position, means at one location on said panel for securing the recording head in any adjusted angular position relative to an axis passing through the head and substantially perpendicular to the panel, a plate member, a hinge formed of two cooperating and engageable parts secured respectively to said plate and to said panel, resilient means engaging said plate and holding the parts of said hinge in engagement, an adjustable stop carried on said panel in position for engagement by said plate when the hinge parts are in engagement and controlling the angular position of said plate about the hinge as an axis, support means for the reproducing head secured to said plate and means for securing the reproducing head to the support means therefor in any adjusted angular position relative to an axis substantially perpendicular to said plate member.

3. The combination according to claim 2 including tape engaging rotatable means carried by said panel for defining the path of the tape and the spacing thereof from the panel.

4. In a magnetic tape recording and reproducing device having recording and reproducing heads, a mount for the heads comprising a panel, adjustable means for supporting the panel in a substantially horizontal position, means at one location on said panel for securing the recording head to the panel with its axis substantially perpendicular to the panel, a plate member, a hinge formed of two cooperating and engageable parts secured respectively to said plate member and to said panel, resilient means engaging said plate member and holding the parts of said hinge in engagement, an adjustable stop carried by said panel in position for engagement by said plate member when the hinge parts are in engagement and controlling the angular position of said plate member about the hinge as an axis, support means for the reproducing head secured to said plate member, means for securing the reproducing head to the support means therefor in any adjusted angular position relative to an axis substantially perpendicular to said plate member and tape guide idlers rotatably mounted on said panel and positioned for engagement with the tape before and after passage by the heads, said idlers being shaped to determine the spacing of the tape path from the panel.

DONALD G. C. HARE.

REFERENCES CITED

The following references are of record in the file of this patent:

UNITED STATES PATENTS

| Number | Name | Date |
|---|---|---|
| 1,552,318 | Lane | Sept. 1, 1925 |
| 1,971,028 | Bothe | Aug. 21, 1934 |
| 2,409,942 | Knapp | Oct. 22, 1946 |

FOREIGN PATENTS

| Number | Country | Date |
|---|---|---|
| 676,810 | Germany | June 12, 1939 |

OTHER REFERENCES

Fiat Final Report No. 705; May 3, 1946, page 23.